Jan. 19, 1960
P. H. SAVET
2,921,380
VERTICAL INDICATOR
Filed April 25, 1956
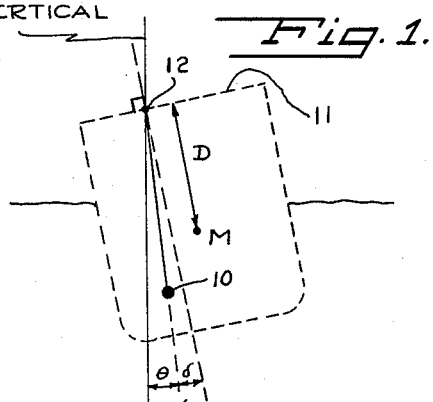
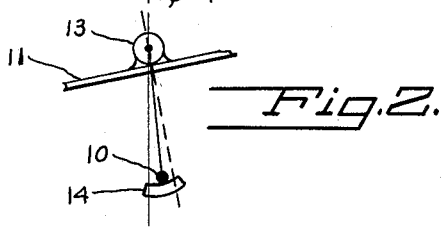
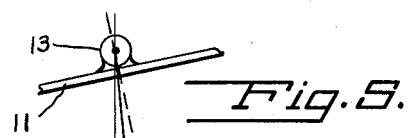
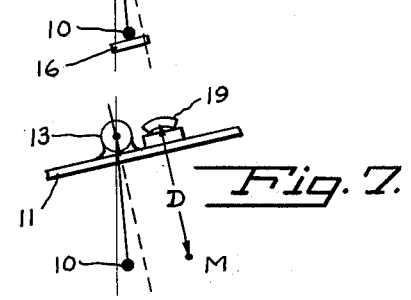
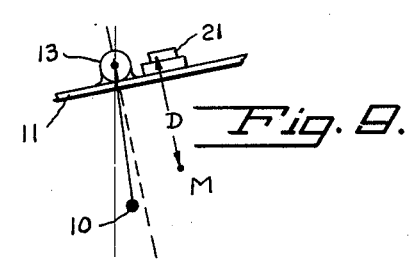
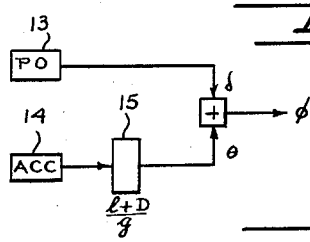
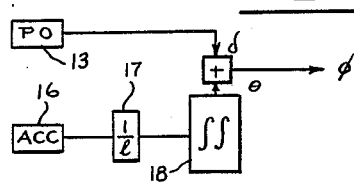
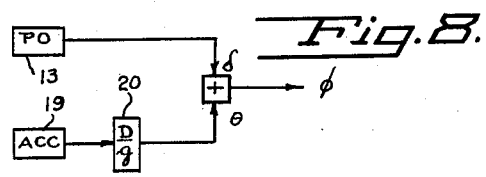
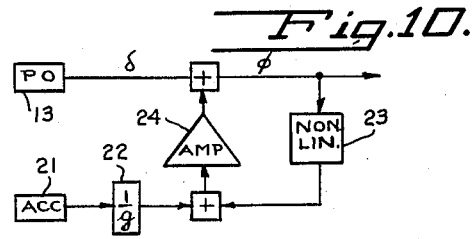
INVENTOR.
PAUL H. SAVET
BY
Raymond A. Paquin
ATTORNEY.

United States Patent Office 2,921,380
Patented Jan. 19, 1960

2,921,380

VERTICAL INDICATOR

Paul H. Savet, Westbury, N.Y., assignor to American Bosch Arma Corporation, a corporation of New York Application April 25, 1956, Serial No. 580,563

8 Claims. (Cl. 33—206)

The present invention relates to vertical indicators and has particular reference to pendulums and correction devices therefor.

The determination of the true vertical direction in a steadily moving system of reference is a problem for which the exact solution requires expensive apparatus while the approximate solution provided by a simple pendulum, is not sufficiently accurate for all purposes.

A pendulum suspended near, but not on, the metacenter of a surface vessel, for example, will oscillate as a result of the rolling and pitching of the vessel. This oscillation around the true vertical constitutes an error inherent in the particular way of sensing the vertical. The error in a long period pendulum is much less than that in a short period pendulum, but the long period pendulum, exemplified by a gyroscopic stable element, may be unduly complicated and costly. With the present invention, the error in the vertical indication of a short period pendulum is reduced to the point where it can be neglected for many applications.

In accordance with the present invention the output of an accelerometer having its sensitive axis in the plane of swing of a short period pendulum and substantially perpendicular to the pendulum axis is used to modify the indication of the vertical as given by the pendulum. Although the indication is an approximation and not as exact as that obtained from a gyroscopic stable element, it is sufficiently precise for many computer applications where a pendulum was previously considered unuseable.

In one embodiment the pendulum carries an angular accelerometer whose output is scaled and combined with the pendulum indication to produce the corrected indication.

In a second embodiment the pendulum carries a linear accelerometer whose output is scaled, integrated and combined with the pendulum indication to produce the corrected indication.

In another embodiment the pendulum support, or deck, carries an angular accelerometer whose output is scaled and combined with the pendulum indication to produce the corrected indication.

In yet another embodiment the pendulum support, or deck, carries a linear accelerometer whose output is applied to a computing circuit in which the computer output is modified and fed back to the accelerometer output, properly scaled, and the resulting signal is combined with the pendulum indication to produce the desired output signal.

For a more complete understanding of the invention reference may be had to the accompanying diagrams, in which—

Fig. 1 defines the quantities used in the discussion of the invention;

Fig. 2 illustrates one embodiment of the mechanical structure of the invention;

Fig. 3 is an explanatory diagram of the forces on the pendulum;

Fig. 4 is a wiring diagram of an electrical computer associated with the structure of Fig. 2;

Fig. 5 is another possible embodiment of the mechanical structure;

Fig. 6 is a schematic diagram of the computer associated with the structure of Fig. 5;

Fig. 7 is another possible embodiment of the mechanical structure;

Fig. 8 is a schematic diagram of the computer associated with the structure of Fig. 7;

Fig. 9 is yet another possible embodiment of the mechanical structure; and

Fig. 10 is a schematic diagram of the computer associated with the structure of Fig. 9.

Referring now to Fig. 1 there is shown a simple pendulum 10 pivoted on an unstable platform 11, such as the deck of a ship, at a point 12 located a distance D above the metacenter M. It should be understood that the term "pivoted on the deck" is used to denote that the position of the pivot 12 is securely fixed with respect to the vessel structure, and that the pivot 12 need not be attached, and usually is not attached, directly to the deck of the vessel, where the word "deck" is used in its common sense. The pendulum is usually a part of a larger instrument carried by the vessel. The pendulum 10 is displaced by an angle $\theta$ from the true vertical, and from the apparent vertical (perpendicular to the deck 11) by an angle $\delta$. The angle between the true vertical and the apparent vertical is, therefore, equal to $\theta + \delta = \phi$.

The angle $\delta$ is measured by a pickoff device 13 (Fig. 2) which is preferably of the rotatable type, so that the pendulum can be hung from the rotor shaft thereof, although other types may be employed, if convenient. The angle $\theta$ can be calculated by any of the means to be described, each of which employs an accelerometer which may be attached to either the deck or the pendulum but which has its sensitive axis in the plane of swing of the pendulum and substantially perpendicular to the pendulum axis.

In Fig. 2 and the following, it is assumed that the pendulum swings in an athwartship plane, i.e. it is pivoted on a fore and aft axis.

In a simple undamped pendulum such as shown in Fig. 3 where the displacement of the pendulum from the true vertical is sufficiently small so that within the permissible range of error the cosine of the angle of displacement may be equated to unity and the sine of the angle of displacement may be equated to the angle itself, the restoring force and the inertia acting on the pendulum are respectively $$-mg\frac{y-x}{l} \quad (1)$$

and $$-m\frac{d^2y}{dt^2} \quad (2)$$

Where $m$ = mass of pendulum weight
$g$ = acceleration of gravity
$y$ = horizontal position of pendulum mass
$l$ = length of pendulum arm
$x$ = horizontal position of pendulum pivot In the stable state the sum of (1) and (2) must be equal to zero so that $$\frac{d^2y}{dt^2} + \frac{g}{l}y = \frac{g}{l}x \quad (3)$$

substituting $Z = l\theta = y - X$ in (3) and simplifying, gives:

$$\frac{d^2Z}{dt^2} + \frac{g}{l}Z = -\frac{d^2x}{dt^2} \quad (4)$$

or $$l\frac{d^2\theta}{dt^2}+g\theta=-\frac{d^2x}{dt^2} \quad (5)$$

Since $D$=apparent vertical distance of suspension above the metacenter M, and $\phi$=the angle of roll, then $$\frac{d^2x}{dt^2}=D\frac{d^2\phi}{dt^2} \quad (6)$$

From (5) and (6)

$$l\frac{d^2\theta}{dt^2}+g\theta=-D\frac{d^2\phi}{dt^2} \quad (7)$$

but $\phi=\theta+\delta$ whence, by substitution and simplification it is found that $$\phi=\delta-\frac{1}{g}\left(D\frac{d^2\delta}{dt^2}+(l+D)\frac{d^2\theta}{dt^2}\right) \quad (8)$$

If the pivot 12 is near the metacenter, D is small and $$\frac{D}{g}\frac{d^2\delta}{dt^2}$$

can be neglected. Therefore, $$\phi=\delta-\left(\frac{l+D}{g}\right)\frac{d^2\theta}{dt^2} \quad (9)$$

In the functional solution for Equation 9, $\delta$ is determined by the pickoff 13 and $$\frac{d^2\theta}{dt^2}$$

by the angular accelerometer 14. The factor $$\left(\frac{l+D}{g}\right)$$

is accounted for by the scaling device 15. The term "proportional to" when applied to a voltage denotes that the magnitude of the voltage is proportional to a quantity and the phase of the voltage corresponds to the sign of the quantity.

The schematic diagram of the computer for this purpose is shown in Fig. 4. The output of the angular accelerometer 14, proportional to $$\left(\frac{d^2\theta}{dt^2}\right)$$

is modified according to $$\left(\frac{l+D}{g}\right)$$

in the scaling device 15, and the output of the scaling device 15 proportional to $$\frac{l+D}{g}\left(\frac{d^2\theta}{dt^2}\right)$$

is subtracted from the output of the pickoff device 13 to produce a voltage proportional to $$\delta-\frac{l+D}{g}\frac{d^2\theta}{dt^2}$$

which is equal to $\phi$ as shown by Equation 9.

If a linear accelerometer 16 is carried by the pendulum 10, as in Fig. 4, double integration of the accelerometer output is required to give the angle $\phi$. This can be seen by the following explanation. A precision linear accelerometer mounted on the pendulum will indicate an acceleration A which is substantially equal to $$A=D\Omega^2\phi \sin \Omega t \cos \theta - g \sin \theta \quad (10)$$

where $D$=distance of suspension above metacenter
$\Omega/2\pi$=roll frequency
$\phi$=maximum angle of roll, and
$\theta$, $g$=are defined as earlier.

Since $\theta$ is a small angle, $\cos \theta=1$ and $\sin \theta=\theta$ and, with sufficient accuracy, $$A=D\Omega^2\phi \sin \Omega t-g\theta \quad (11)$$

The equation of the pendulum is, from (5)

$$l\frac{d^2\theta}{dt^2}+g\theta=-\frac{d^2x}{dt^2} \quad (5)$$

Since X is the horizontal displacement of the suspension, its maximum value is $D\phi$ where $\phi$ is the angle of roll, and its instantaneous value is $X=D\phi \sin \Omega t$. Therefore, $$\frac{d^2x}{dt^2}=-D\phi\Omega^2 \sin \Omega t \quad (12)$$

and Equation 5 becomes $$l\frac{d^2\theta}{dt^2}+g\theta=D\phi\Omega^2 \sin \Omega t \quad (13)$$

From (11) and (13) it will be seen that $$A=l\frac{d^2\theta}{dt^2}$$

or $$\theta=\iint_0^t \frac{A}{l}dt^2 \quad (14)$$

which indicates that the angle $\theta$ can be determined by double integration of the linear accelerometer output.

Fig. 6 shows the computer associated with the pendulum carried-linear accelerometer of Fig. 5. The output of accelerometer 16 proportional to $$l\frac{d^2\theta}{dt^2}$$

is applied to the scaling device 17 to derive a signal proportional to $$\frac{d^2\theta}{dt^2}$$

which is the input to the integrating device 18. The integrator may be of any suitable type in which the output voltage is proportional to the double integral with respect to time of the input voltage. The voltage proportional to $\theta$, thus derived, is added to the output $\delta$ of pickoff 13 to produce a voltage proportional to $\phi$.

This device requires a precision type linear accelerometer since static friction in the accelerometer may cause an initial offset resulting in an error which increases during the integration process. It is likely that the error could become so large as to make the device useless.

In the third embodiment of the invention, an angular accelerometer having a short time constant is mounted on the unstable platform or deck 11 with its axis of rotation parallel to the axis of rotation 12 of the pendulum 10.

Consider the Equation 7 which may be written in operational form as $$(lp^2+g)\theta=-Dp^2\phi \quad (15)$$

From this, $\theta$ is found to be $$\theta=-\frac{Dp^2\phi}{lp^2+g}=-\frac{Dp^2\phi}{g\left(1+\frac{l}{g}p^2\right)} \quad (16)$$

If $l/g$ is small, which is the situation in the short period pendulum assumed here, the equation for $\theta$ becomes $$\theta=-\frac{D}{g}p^2\phi \quad (17)$$

Equation 17 shows that the angle $\theta$ between the pendulum and the true vertical is substantially equal to $$-\frac{D}{g}\frac{d^2\phi}{dt^2}$$

If the time constant of the angular accelerometer on the deck is sufficiently short, the output of the accelerometer will be very nearly proportional to $$\frac{d^2\phi}{dt^2}$$

Therefore, the output of the accelerometer is proportional to $\theta$. This relationship suggests the arrangement of Fig. 7 and the circuit of Fig. 8 as a solution of the problem. Thus, referring to Figs. 7 and 8, the $$\frac{d^2\phi}{dt^2}$$

output of a short time constant angular accelerometer 19 which is secured to the deck 11 at a distance D above M is modified in the scaling device 20 to be proportional to $$-\frac{D}{g}\frac{d^2\phi}{dt^2}$$

which is equal to $\theta$. This output of the scaling device 20 is combined with the $\delta$ output of pickoff device 13 to give a signal proportional to $\theta$.

A linear accelerometer mounted on the deck will measure a linear acceleration:

$$a = D\frac{d^2\phi}{dt^2} - g \sin \phi \qquad (18)$$

if transient terms are neglected.

Whence:

$$g \sin \phi = D\frac{d^2\phi}{dt^2} - a \qquad (19)$$

and $$\sin \phi = \frac{D}{g}\frac{d^2\phi}{dt^2} - \frac{a}{g}$$

But from Equation 17

$$\theta = -\frac{D}{g}\frac{d^2\phi}{dt^2}$$

so that $$\sin \phi = -\theta - \frac{a}{g}$$

or $$\theta = -\left(\frac{a}{g} + \sin \phi\right) \qquad (20)$$

Since $\phi$ is equal to $\delta + \theta$ $$\phi = \delta - \frac{a}{g} - \sin \phi \qquad (21)$$

and can be determined in a computer containing a non linear network and utilizing feedback. Referring now to Figs. 9 and 10, the output of the linear accelerometer 21 which is mounted on the deck 11 is scaled according to $l/g$ in the scaling device 22 and is added to the output of the non-linear network 23 in which the output signal is equal to sine of the input signal.

The combined signal is applied to the cathode follower or booster amplifier 24, the output of which is combined with the $\delta$ output of pickoff device 13. Assuming that the combined signal is X, then the output of network 23 is sin X and the input to the cathode follower 24 is $a/g + \sin X$. Since the output of the cathode follower 24 is subtracted from $\delta$ to give X, the following relationship can be written, $$x = \delta - G\left[\frac{a}{g} + \sin x\right]$$

where G is the ratio of the output to the input of amplifier 24. If G is made equal to unity, $X = \phi$ since, according to Equation 21, $$\phi = \delta - \left[\frac{a}{g} + \sin \phi\right]$$

I claim:

1. In a device of the character described, an unstable platform, a short period pendulum suspended from said platform, pickoff means for measuring the displacement between said pendulum and said platform, accelerometer means carried by said pendulum or said platform for measuring the acceleration of said pendulum, computer means for determining the true vertical from the outputs of said pickoff means and said accelerometer means, and electrical connections between said pickoff means and said computer means, and between said accelerometer means and said computer means, the output of said computer means indicating the angle between said unstable platform and the true vertical.

2. In a device of the character described, an unstable platform, a pendulum suspended from said platform, pickoff means for measuring the displacement between said pendulum and said platform, angular accelerometer means mounted on said pendulum or said platform for measuring the acceleration of said pendulum and having an output indicative of the angular acceleration of said pendulum or platform, electrical connections between the outputs of said accelerometer and said pickoff whereby the angle between said platform and the true vertical is indicated by the combined outputs of said accelerometer and pickoff.

3. In a device of the character described, an unstable platform, a pendulum suspended from said platform, pickoff means for measuring the displacement between said pendulum and said platform, angular accelerometer means mounted on said platform or said pendulum for measuring the acceleration of said pendulum and having an output indicative of the angular acceleration of said platform or pendulum, means to modify the output of said accelerometer, electrical connections between the output of said modifying means and said pickoff means whereby the angle between said platform and the true vertical is indicated by the combined outputs of said accelerometer and pickoff.

4. In a device of the character described, an unstable platform, a pendulum suspended from said platform, pickoff means for measuring the displacement between said pendulum and said platform, angular accelerometer means mounted on said platform or said pendulum for measuring the acceleration of said pendulum and having an output indicative of the angular acceleration of said platform or pendulum, scaling means to modify the output of said accelerometer, electrical connections between the output of said scaling means and said pickoff means whereby the angle between said platform and the true vertical is indicated by the combined outputs of said accelerometer and pickoff.

5. In a device of the character described, an unstable platform, a pendulum suspended from said platform, pickoff means for measuring the displacement between said pendulum and said platform, angular accelerometer means mounted on said pendulum for measuring the acceleration of said pendulum and having an output indicative of the angular acceleration of said pendulum, scaling means to modify the output of said accelerometer, and electrical connections between the output of said scaling means and said pickoff means to indicate the difference thereof and thereby indicate the angle between said platform and the true vertical.

6. In a device of the character described, an unstable platform, a pendulum suspended from said platform, pickoff means adapted to measure the displacement between said pendulum and said platform, angular accelerometer means mounted on said platform and having an output indicative of the angular acceleration of said platform, scaling means to modify the output of said accelerometer, and electrical connections between the output of said scaling means and said pickoff means to indicate the sum thereof and thereby indicate the angle between said platform and the true vertical.

7. In a device of the character described, an unstable platform, a pendulum suspended from said platform, pickoff for measuring the displacement between said pendulum and said platform, linear accelerometer means mounted on said pendulum for measuring the acceleration of said pendulum and having an output, double integrating means connected to said accelerometer output, and electrical connections between said integrating means and said pickoff means to obtain the sum of the outputs thereof and to indicate the angle between said platform and the true vertical.

8. In a device of the character described, an unstable platform, a pendulum suspended from said platform, pickoff means adapted to measure the displacement between said pendulum and said platform, linear accelerometer means mounted on said platform and having an output, a non-linear network having an input and an output, an amplifier having an input and an output, electrical connections between the outputs of said accelerometer, said network and the input of said amplifier, and electrical connections between the outputs of said pickoff and said amplifier and the input of said network, whereby the input of said network indicates the angle between said platform and the true vertical.

References Cited in the file of this patent
UNITED STATES PATENTS

| | | |
|---|---|---|
| 2,176,807 | Wunsch | Oct. 17, 1939 |
| 2,627,384 | Esval | Feb. 3, 1953 |
| 2,659,985 | Cloud | Nov. 24, 1953 |